Oct. 6, 1942.        H. B. HARTMAN        2,298,124
ULTRA-VIOLET RAY LIQUID STERILIZER
Filed May 14, 1941        3 Sheets-Sheet 3

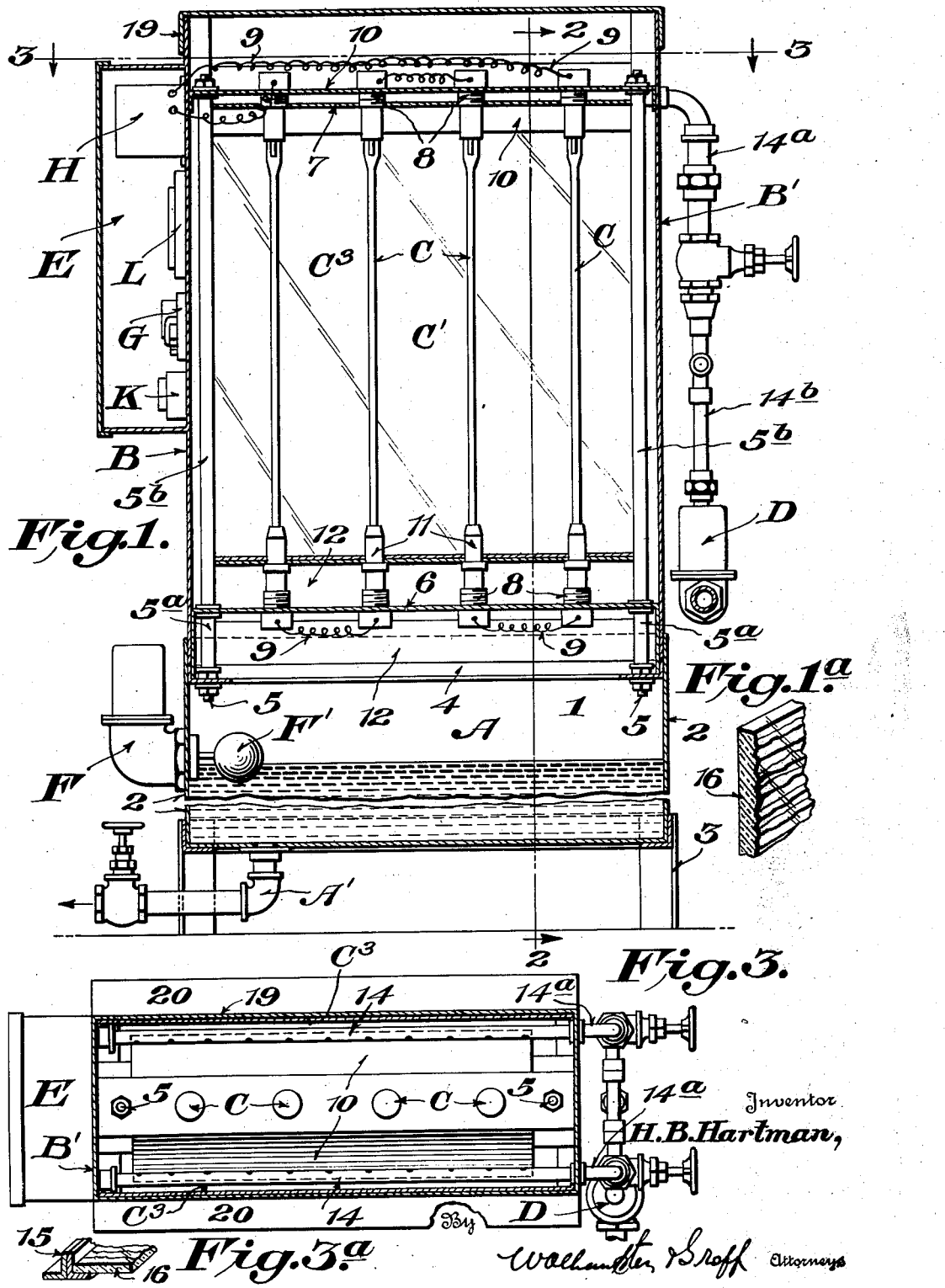

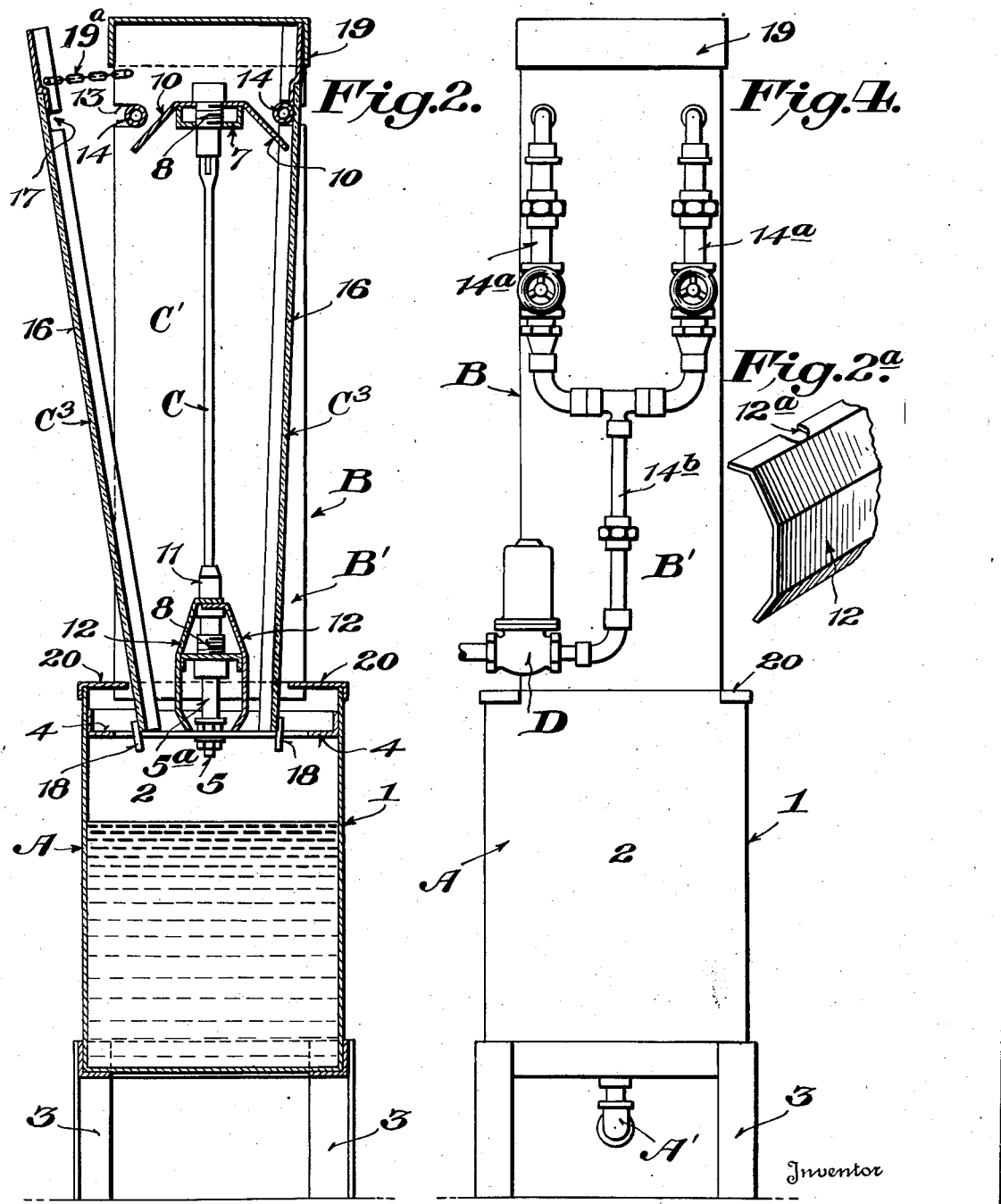

Inventor
H.B.Hartman,
Attorneys

Patented Oct. 6, 1942

2,298,124

UNITED STATES PATENT OFFICE 2,298,124

ULTRA VIOLET RAY LIQUID STERILIZER

Harry Buxton Hartman, Florence, Mass.

Application May 14, 1941, Serial No. 393,458

6 Claims. (Cl. 250—45)

This invention relates to apparatus for sterilizing liquids, such as water, milk, simple syrup, etc., by utilizing ultra-violet ray radiation.

Apparatus now in general use for sterilizing liquids by the ultra-violet ray employs a quartz lamp or quartz receptacle so that the liquid comes into contact with either the lamp tube itself or the glass receptacle surrounding the same. In either case, the lamp or the receptacle becomes quickly coated with a film of impurities contained in the liquid, thereby preventing the effective transmission of the ultra-violet ray and consequently reducing the efficiency of the apparatus unless the lamp or receptacle is continuously cleaned. By way of example, it may be pointed out that water containing a high iron content will quickly deposit iron on the lamp or receptacle, and similar deposits or films will occur in connection with other liquids.

Accordingly, a primary object of the invention is to provide an apparatus wherein the liquid to be sterilized does not at any time come in contact with the lamp or its receptacle but is spaced from and in direct line with the radiation emitted from the tube at all times, the liquid itself being conveyed slowly down an inclined surface and kept in constant turbulence during flow so that the ultra-violet ray effectively penetrates and treats all parts of the liquid during its time of travel through the effective radiation zone of the lamps. In that connection, one of the features of the invention is to provide novel means for providing a continuously flowing thin film of the liquid, and by causing turbulence therein, effectively expose every drop of the liquid, thereby killing bacteria according to the particular formula adopted for the time of liquid travel in relation to the ray emitting capacity of the tube.

Another object of the invention is to provide an apparatus which is fully automatic throughout its entire operation. That is to say, it is proposed to coordinate the liquid flow controling parts of the apparatus or machine with the functioning of the ray emitting tubes in such a way that the tubes are lighted before flow of the liquid is commenced and are maintained lighted after flow is stopped or shut off, thereby insuring that no liquid passes through the apparatus unless it has been subjected to the proper length of travel before the ray emitting tubes giving off adequate intensity of rays to kill the particular bacteria in the liquid under treatment.

A further object of the invention is to provide apparatus which is so constructed that it may be easily and readily cleansed, thereby not only providing a completely sanitary machine but also rendering the same machine useful for treating different kinds of liquid by merely thoroughly cleaning the same after each period of use.

With the above and other objects in view which will more readily appear as the nature of the invention is better understood, the same consists in the novel combination and arrangement of parts hereinafter more fully illustrated and claimed.

A preferred and practical embodiment of the invention is shown in the accompanying drawings, in which:

Figure 1 is a vertical longitudinal sectional view of the machine constituting the invention.

Fig. 1ᵃ is a detail view of the glass panes which constitute one of the side panels of the sterilizer housing.

Fig. 2 is a vertical sectional view taken on line 2—2 of Fig. 1.

Fig. 2ᵃ is a detail perspective view of one section of the lower moisture guard for the ultra-violet ray tubes.

Fig. 3 is a horizontal sectional view taken on line 3—3 of Fig. 1.

Fig. 3ᵃ is a fragmentary perspective of the side frame of the side panels showing how the glass pane is held in place.

Fig. 4 is a side elevation of the right-hand end of the machine shown in Fig. 1.

Similar reference characters designate corresponding parts throughout the several figures of the drawings.

Figure 6:
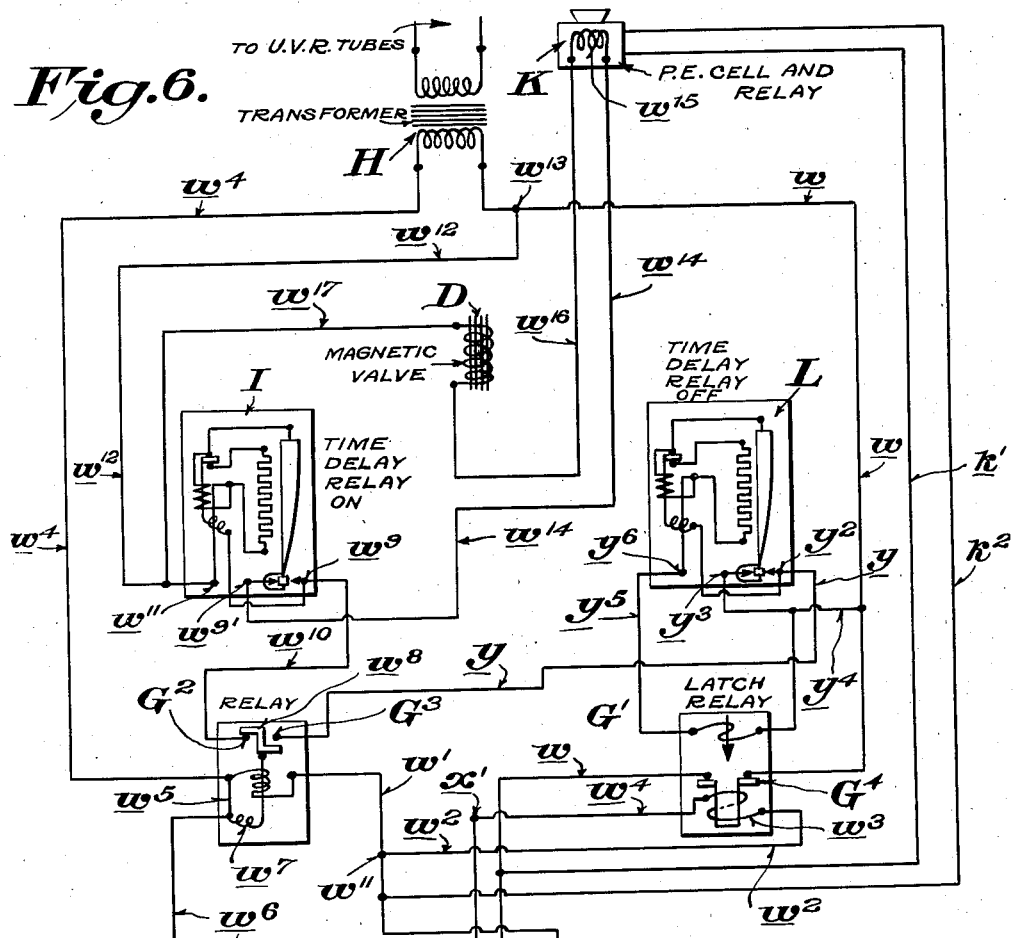
Fig. 6 is a diagram of the control means and circuits therefor.

According to the embodiment shown in the drawings, the present apparatus includes in its organization a tank or receptacle, designated generally as A, for receiving treated liquid. A superstructure or housing designated generally as B is mounted on top of the tank A and contains the ultra-violet ray emitting tubes C within a sterilizing chamber C′ formed by the glass side panels C³ and the end walls B′. Liquid to be treated is supplied to the top of the treating chamber C′, in a manner which will hereinafter more fully appear, through suitable piping connected with a magnetically controlled supply valve D. One of the end walls of the superstructure or housing B is provided with a control box E which houses the essential automatic devices for controlling the operation of the tubes or lamp C, as well as the flow of liquid. The said automatic devices in the control box E are brought into and out of operation by a float control valve F having a float F'' in the sterilized liquid containing tank or receptacle A. Sterilized liquid is led off or conveyed from the tank A through a suitable outlet connection A'.

Figure 5:
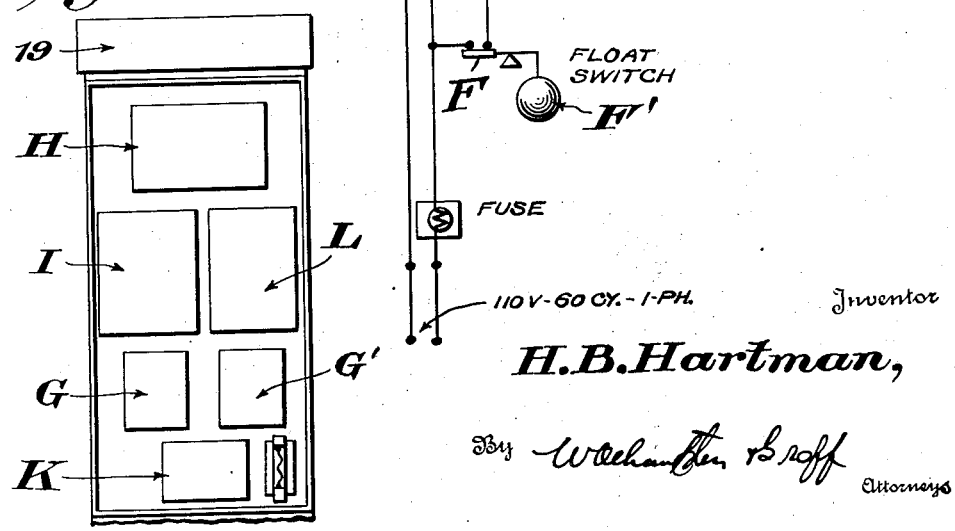
Fig. 5 is a partial end elevation of the end of the machine opposite that shown in Fig. 4.

For convenience in future reference, the devices contained within the control box E may be respectively designated in Figs. 5 and 6 as master relay G, a latch relay G', a transformer H, an initial time delay relay I, a photo-electric cell K, and a second time delay cut-off relay L which functions to unlock the latched relay G' when the float control switch is opened due to the liquid level in tank A reaching its maximum height. All of these devices are standard electrical equipment and are not novel in themselves. However, they are assembled in a novel circuit arrangement which will be later explained.

A tank A preferably consists of the side walls 1 and the end walls 2 mounted upon suitable legs 3. The upper inner portions of the side walls 1 and 2 of the tank are fitted with angle irons 4 on all sides thereof, the vertical legs of the anchor members being secured to the tank and the horizontal legs projecting inwardly to form housing supports, particularly adjacent the end walls 2. The float control switch F and float F'' are mounted in one of the end walls 2 of the tank.

The housing B is preferably supported by the standards 5—5, which preferably consist of internal tie rods and external sleeve portions, the lower ends of the rods being secured in the horizontal legs of the angle members 4 secured to the end walls 2—2 of the tank. Through the use of the spacing sleeve 5ª of the standards, a lower tube supporting bridge piece 6 of inverted channel shape in cross-section is supported above the open end of the tank A. Also, by the use of spacing sleeves 5ᵇ, upper ends of the standards 5 support an upper bridge piece 7, which, like the bridge 6, is of inverted channel shaped cross-section. The bridge pieces 6 and 7 support the ultra-violet lamps or tubes C, suitable sockets 8 being provided to receive the opposite ends of the tubes. The tubes 3 are connected in series with the transformer H through suitable high tension leads 9.

The upper ends of the tubes C are sheltered or covered through the use of a water-shed or splash shield which is preferably of substantially channel-shaped cross-section with inclined side walls 10, the web of the channel overlying the upturned channel of the upper bridge piece 7 carried by the standards 5 and being suitably secured in position at the base of the upper tube sockets 8.

The lower ends of the tubes C are provided with a rubber or equivalent hood 11 which fits over the ends of the tubes in such a way as to prevent the entrance of liquid to the lower terminals of the tubes fitted in the lower sockets 8. In addition, the base assembly of the tubes C is protected by moisture guard means comprising a pair of cooperating guard plates 12. These plates have the general cross-sectional shape shown in Figs. 2 and 2ª and have their upper edges designed to fit in overlapping relation, suitable half notches 12ª being provided in the edges of the overlapping parts to fit snugly around the rubber hoods 11. The side walls of each guard are preferably inclined outwardly and downwardly so that the ends of their lower edges rest on the angle irons 4—4, secured to the side walls 2—2 of the tank A.

The ultra-violet ray tubes C are disposed within the radiating chamber C', previously referred to, and which is formed by the end walls B' and the side walls or side panels C³. The said end walls B' of the housing extend vertically upward from the top edges of the end walls 2—2 of the tank A and are notched at their upper edges, as indicated at 13, to receive the horizontally disposed liquid supplying pipes 14 which are connected by branch pipes 14ª to a common feeder 14ᵇ having the magnetically controlled inlet valve D therein, as will be apparent from Fig. 4.

The side panels C³ preferably consist of suitable angle iron frames 15 in which the glass panes 16 are mounted. These panels preferably have a roughened or riffled inner face for the purpose of creating turbulence in the liquid flowing thereover and supplied through the perforated pipes 14 when the panels are assembled in operating position. The angle irons which constitute the side members of the panel frames fit flushly or snugly within the end walls B' of the housing B and the side members of the frames 15 are notched as indicated at 17 to fit over the pipes 14 when the panel is in operative position. The lower end of each panel C³ rests on the horizontal legs of the angle irons 4 carried by the side walls 2—2 of the tank A. Suitable lugs or equivalent holding means 18 are provided in the angle members 4 referred to for the purpose of maintaining the lower end of the panels C in the desired position relative to the tank A, so that all liquid passing over the riffled face of the glass panes 16 will discharge into the tank.

The upper ends of the panels C³ are held in operative relation to the liquid supplying pipes 14 by a cap 19 which is flanged at all sides so as to telescopically interfit over the end walls B' and also embrace the upper ends of the frames 15 of the panels. The arrangement described permits of outward tilting of the panels C³ by moving the cap or cover 19. That is to say, as will be observed from the left-hand side of Fig. 2, when the cap or cover 19 is removed, the panel may be tilted or inclined outwardly and held in this position by the link or chain 19a or its equivalent. Thus, by placing the panels in this position, when the cap or cover 19 is removed it will be observed that the glass panes 16 may be readily cleaned.

The arrangement of ultra-violet ray tubes C and the panels C³ having the glass panes 16, together with the perforated supply pipes 14, permit liquid to be sterilized to be uniformly distributed over the inside riffled face of the side panes so that it will travel downwardly toward the tank A, and during its descent will receive the full benefit of the radiating effect of the ultra-violet ray tubes C. The splash shields 10 at the top of the tubes will prevent any spray or mist issuing from the perforated pipes 14 coming in contact with the upper ends of the tubes C, and because of their inclination, any liquid that makes its way to the top of the wings 10 will be dropped back onto the riffled surface of the panes 16 because the panes themselves are inclined inwardly, or converge, as they approach the open top end of the tank A. Likewise, the hoods 11 and moisture guards 12 protect the lower tube sockets 8 so that there is no danger of liquid coming in contact with the lower terminals of the tube.

The top of the tank A, at each side of the lower ends of the panels $C^3$, is provided with cover plates 20. These cover plates are normally in position while the machine is in operation, but may be removed for cleaning, when desired.

As previously indicated, it is intended to provide automatic controls which coordinate the operation of the ultra-violet ray tubes and the flow of liquid so that all parts of the liquid are properly acted upon by the bacteria killing ultra-violet rays as it passes through the machine. To accomplish this purpose the magnetic control inlet valve D is not opened until the ultra-violet ray producing tubes C have not only been illuminated, but have acquired sufficient intensity to produce the bacteria killing ray of the desired degree measured in angstrom units.

When the tank A is filled to the maximum level and the float control switch F is opened, the magnetic inlet valve D is instantly closed and no further liquid is supplied to the machine. The ultra-violet ray producing tubes C, however, remain illuminated for a period of thirty seconds to one minute after the inlet valve D is closed so as to insure that liquid remaining in the pipes 14 at the time of cutoff will be treated with the ray as it cascades over the inner faces of the riffled panes 16.

Referring to Fig. 6, it will be observed that the float control switch F is constructed to be closed when the liquid level in tank A drops and is opened when the liquid level rises to its maximum limit. On closing the float switch F—F', the transformer H is first energized to start the operation of the ultra-violet ray tubes C. The current path is as follows, from main line $w$, through switch and line $w'$ to point $w''$, thence through $w^2$, coil $w^3$ (to lock latch holding bridge $G^4$ across terminals of main line $w$ in latch relay $G'$ to supply transformer H) thence through line $w^4$ to opposite side of main line $x$ at point $x'$. Current is then supplied by continuing main line $w$ to right hand terminal of transformer H. From left terminal of said transformer current proceeds through lead $w^4$ to bridge line $w^5$ of relay G and here branches back through lead $w^6$ to line $x$ and through lead $w^7$ to terminal $G^2$ of master control relay G since solenoid bar $w^8$ has been pulled down through energization of its coil fed by current from line $w'$ and bridge $w^5$.

The initial time delay relay I has its one terminal contact $w^9$ connected with terminal $G^2$ by wire $w^{10}$ and its terminal $w^{11}$ is connected to main line $w$ by line $w^{12}$ at point $w^{13}$. The other thermal contact terminal $w^{91}$ is connected by wire $w^{14}$ with one end of the coil $w^{15}$ of the relay in photo-electric cell K and the other terminal of said coil is connected by lead $w^{16}$ with one terminal of the magnetic valve D whose other terminal is connected by lead $w^{17}$ to lead $w^{12}$. The lamp of the standard photo-electric cell K is energized simultaneously with the closing of the float switch through lead $k'$ connecting with wire $w$ and lead $k^2$ connecting with wire $w'$. The time delay relay I and photo-electric cell K cooperate to prevent opening of inlet valve D until tubes C have reached predetermined ray producing capacity so that no liquid will flow down the panels $C^3$ without being properly treated.

As long as the level of liquid in the tank A remains low and the switch F—F' remains closed, the circuits described will prevail unless perchance the tubes do not maintain their rated ray producing efficiency as determined by the electric eye K. If the lamps fall below a given intensity, the relay of the photo-electric cell opens and immediately causes the magnetic solenoid valve D to close, thereby stopping the operation of the machine.

When the switch F—F' opens, the circuit to relay I is broken at terminal $G^2$ because solenoid bar $w^8$ is spring-biased upwardly so that its contact pulls away from $G^2$ and engages terminal $G^3$ of the said relay, thereby to energize relay L. The magnetic valve D is instantly closed on opening the switch because the circuit is broken at terminal $G^2$ so that wires $w^{10}$, $w^{11}$, $w^{12}$, $w^{14}$, $w^{16}$, $w^{17}$ become dead. The current temporarily continues through the transformer H and tubes C, however, because of the time delay relay L which permits the latch of relay $G'$ locking the line $w$ until the thermal element of the relay L heats up and releases the latch holding bridge $G^4$ across line $w$. That is to say, on the opening of switch F current from one side $x$ of main line proceeds through lines $w^6$, solenoid lead $w^7$, bar $w^8$, through line $y$ to terminal $y^2$ of relay L where it branches through thermal heating element of relay to terminal $y^3$ connected by lead $y^4$ to line $w$ and also to the latch releasing loop $y^5$ which is connected across lead $y^4$ and terminal $y^6$ of cut-off relay L. During the interval required for the thermal element of the relay L to heat up and break the circuit between terminals $y^2$ and $y^3$, the circuit $y^5$ unlocks the latch bar $G^4$ and breaks the circuit in the line $w$ which feeds the lamps, thus cutting out all operation of the machine.

From the foregoing, it will be apparent that when the machine is set in operation by the lowering of the float F' and the closing of the switch F, the master relay G energizes the initial time delay relay I and instantly illuminates the tubes C fed from the transformer H. Also, the photo-electric cell K, which is included in circuit with the relay I, and the magnetic inlet valve D will respond to the illumination of the tubes C so that when the tubes have reached the proper intensity, and sufficient time has elapsed in the relay I to insure that the tubes are operating at proper capacity, the magnetic valve D will be opened. If for any reason the tubes do not continue to produce the desired ray intensity, the photo-electric cell will break the circuit to the magnetic valve through the relay I and automatically shut off the flow of incoming liquid. Assuming, however, that the tubes are operating at a proper rate of efficiency and the float switch F remains closed due to low level in the tank A, the master relay G, through its contact $G^2$, and the latch relay $G'$ will continue in operation to supply current to the transformer H which feeds the ultra-violet ray tube C.

The construction described lends itself particularly to duplication in order to increase the capacity of the machine. That is to say, if it is desired to double, triple or quadruple the sterilizing capacity of a particular installation, it is only necessary to add additional units, including tanks, sterilizer housings, and, of course, tubes within the housings, and use a photo-electric cell in each unit wired in series back to the original unit where a single set of relays, etc., can be used to control the original as well as the additional units. Thus, if a user has one of the units constructed in accordance with the present invention and desires to increase his output of sterilized liquid, additional units constructed as described herein may be banked together and the inlet lines for untreated liquid may be coupled with a single magnetically controlled valve, and likewise all the sterilized liquid outlets may be connected together, while the tubes of the several added units will simply be connected in circuit with the original unit, thereby making it possible to use the original set of electrical controls without the expense of adding additional controls.

I claim:

1. In an apparatus for sterilizing liquids, the combination including a tank for storing sterilized liquid, a sterilizer housing supported on the tank and comprising end walls and side walls formed by downwardly and inwardly converging removable panels whose inner sides provide liquid film carrying surfaces which discharge into the tank, a pair of standards carried by the tank and disposed between said side walls of the housing, upper and lower horizontally disposed bridge members carried by the standards, tube sockets carried by said members, ultra-violet ray generating tubes mounted in said sockets, untreated liquid supply pipes having side openings for discharging untreated liquid onto the side walls, means carried by the upper bridge member for shielding the upper ends of the ultra-violet ray tubes from liquid discharged from said supply pipes, moisture-proof hoods on the lower ends of the ultra-violet ray tubes, moisture guard means cooperating with said hoods for protecting the sockets on the lower bridge member, said guard means comprising a pair of plates having overlapping upper edge portions provided with mating notches to receive said hoods and having their sides directed toward said tank, and means coordinating the flow of untreated liquid from said liquid supply pipes and the operation of said tubes whereby said tubes are set in operation before flow of untreated liquid begins and remain in temporary operation after the flow has ceased from said liquid supply pipes.

2. In an apparatus for sterilizing liquids by ultra-violet ray treatment, the combination including a storage tank, ultra-violet ray generating tubes, means for cascading liquid to be treated at each side of the ultra-violet ray tubes, means for supplying untreated liquid to said last-named means including the inlet pipe, a magnetically opened and closed inlet valve in said inlet pipe, a float controlled switch on the storage tank, and electrical means in circuit with said switch and inlet valve for coordinating the flow of untreated liquid through said inlet pipe and the operation of said tubes, whereby said tubes are set in operation before flow of untreated liquid begins and remain in operation after flow has ceased in said inlet pipe, said means including an initial time relay in circuit with the magnetically opened and closed valve, a photoelectric cell exposed to radiation from said tubes, and a master control relay in circuit with said switch, tubes, cell and said initial time relay, and cut-off relay means also in circuit with the master control relay and switch.

3. In an apparatus for sterilizing liquids, the combination including a linear series of ultra violet ray producing tubes, a panel at each side of said tubes for conducting liquid to be sterilized in the path of rays generated by said tubes, means for supplying and distributing liquid to be sterilized to the tops of said panels, and an electric control circuit for said ultra violet ray producing tubes including a photoelectric cell exposed directly to radiation from said tubes for controlling the operation of the lamps and the flow of fluid over said panels.

4. In an apparatus for sterilizing liquids, the combination including a linear series of ultra violet ray producing tubes, a panel at each side of said tubes for conducting liquid to be sterilized in the path of rays generated by said tubes, means for supplying and distributing liquid to be sterilized to the tops of said panels, and an electric control circuit for said ultra violet ray producing tubes including a photoelectric cell exposed to radiation from said tubes, said circuit including an electrically operated control valve in said means for distributing and supplying liquid to the panels, and relay means responsive to said photoelectric cell for delaying the opening of said fluid control valve until the lamps have reached a predetermined efficiency in the emission of rays of the desired wave length measured in angstrom units, and other relay means in said circuit and interconnected with said first mentioned relay means for controlling the closing of said fluid valve prior to the cessation of the illumination of the lamps.

5. In an apparatus for sterilizing liquids, the combination including, a tank for sterilized liquid, a sterilizing housing supported over and above the tank and comprising fixed end walls and side walls formed by removable panels whose inner faces provide for a flow of liquid film and whose lower ends converge and discharge into the tank, a cover including means engaging the fixed end walls and the upper ends of the side walls to hold them assembled to the housing, a plurality of spaced linearly arranged vertically disposed ultra-violet ray generating tubes supported between said panels to subject the liquid film flowing thereover to intensified radiation from said tubes substantially throughout the full length of the panels, untreated liquid supply pipes at the upper inner sides of the panels constituting the side walls and having openings discharging toward said panels, and means for supplying untreated liquid to said liquid supply pipes.

6. In an apparatus for sterilizing liquids, the combination including, a tank for sterilized liquid, a sterilizing housing supported on the tank and comprising end walls and side walls formed by downwardly and inwardly converging removable panels whose inner sides provide liquid film carrying surfaces which discharge into the tank, a pair of vertical standards carried by the tank and disposed between said side walls of the housing, upper and lower horizontally disposed bridge members carried by the standards, complementary tube sockets respectively carried by said bridge members and having their longitudinal axes in vertical alignment, vertically disposed ultra-violet ray generating tubes each mounted in a pair of said complementary sockets, untreated liquid supply pipes having openings for discharging untreated liquid onto the inner surface of the panels, a splash shield carried by the upper bridge member and having wings extending toward the panels below said supply pipes, guard means for protecting the lower ends of the tubes and their sockets from liquid descending from said panels, and means for supplying untreated liquid to said liquid supply pipes.

HARRY BUXTON HARTMAN.